Sept. 1, 1936. E. L. RAGONNET 2,053,205
PORTABLE HYDRAULIC TESTING MACHINE
Filed Oct. 29, 1932 4 Sheets-Sheet 4
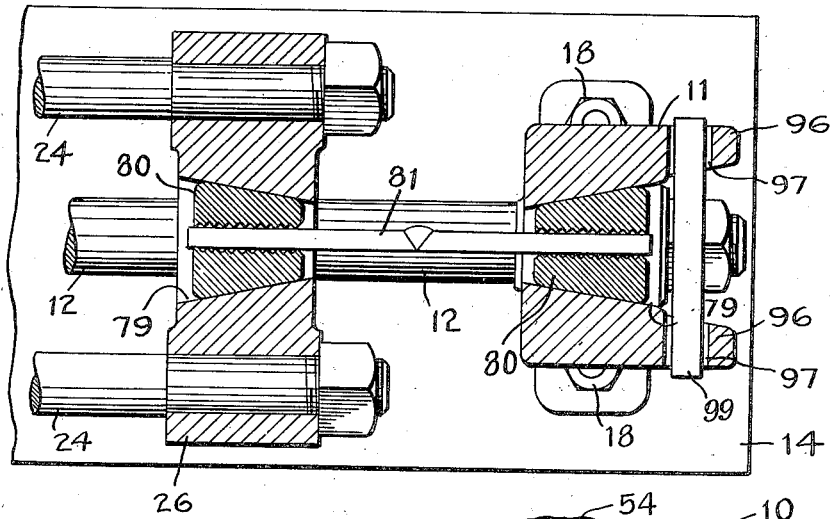
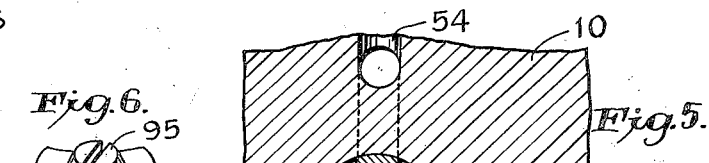
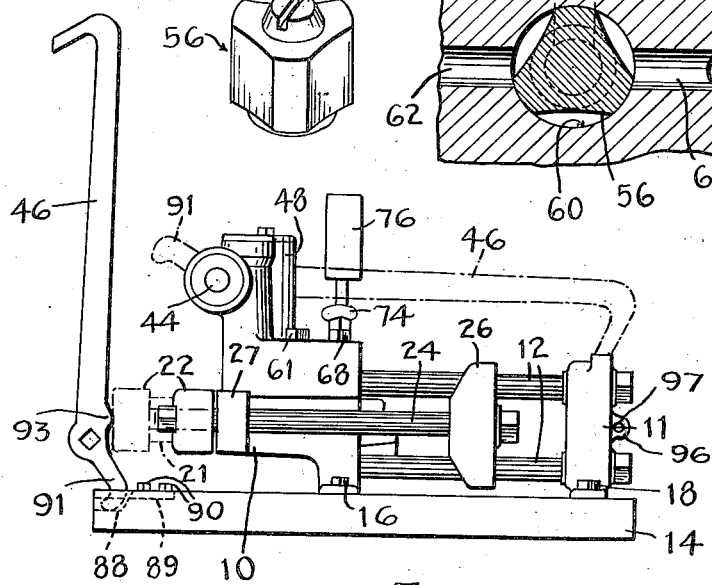

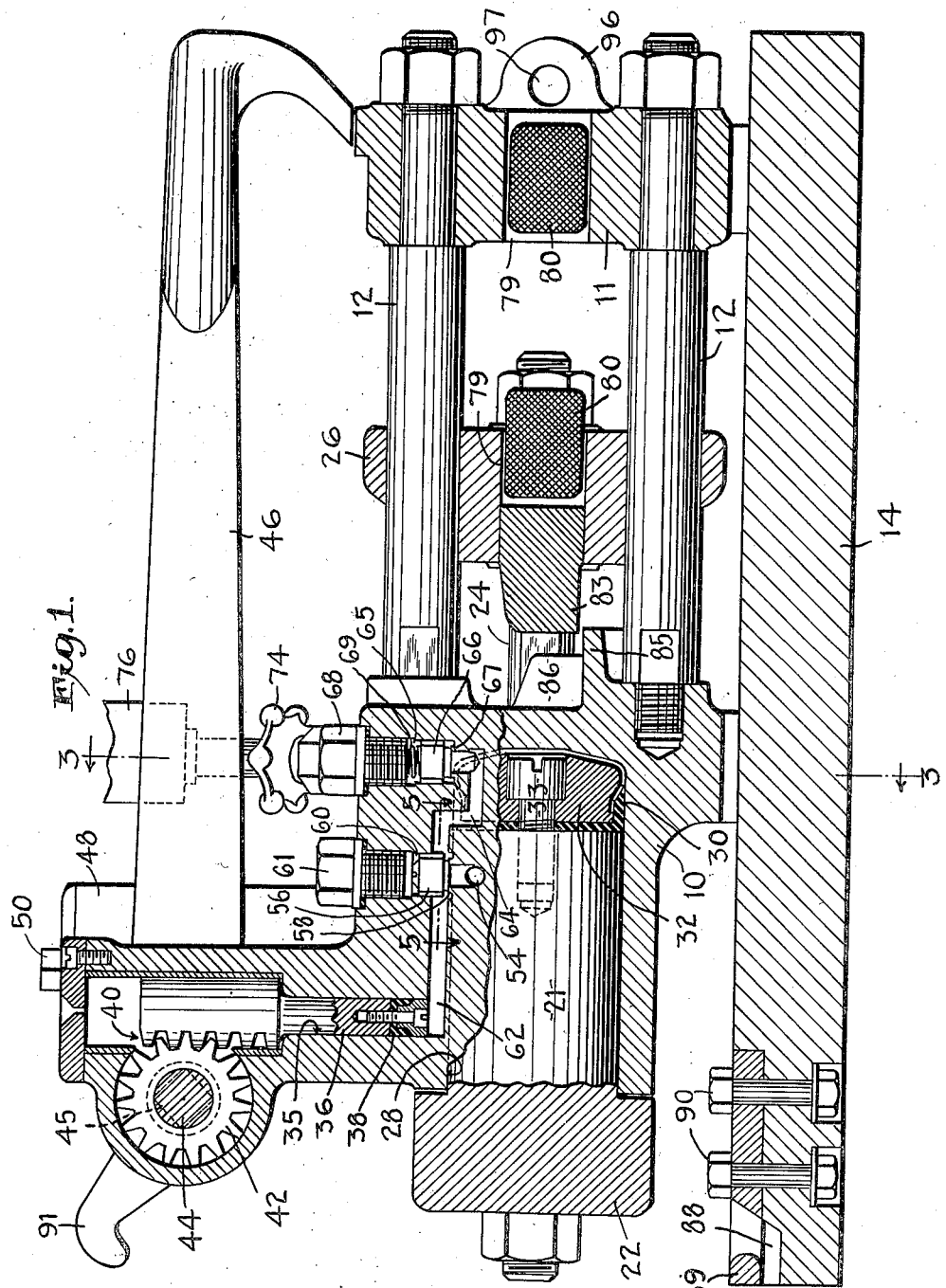

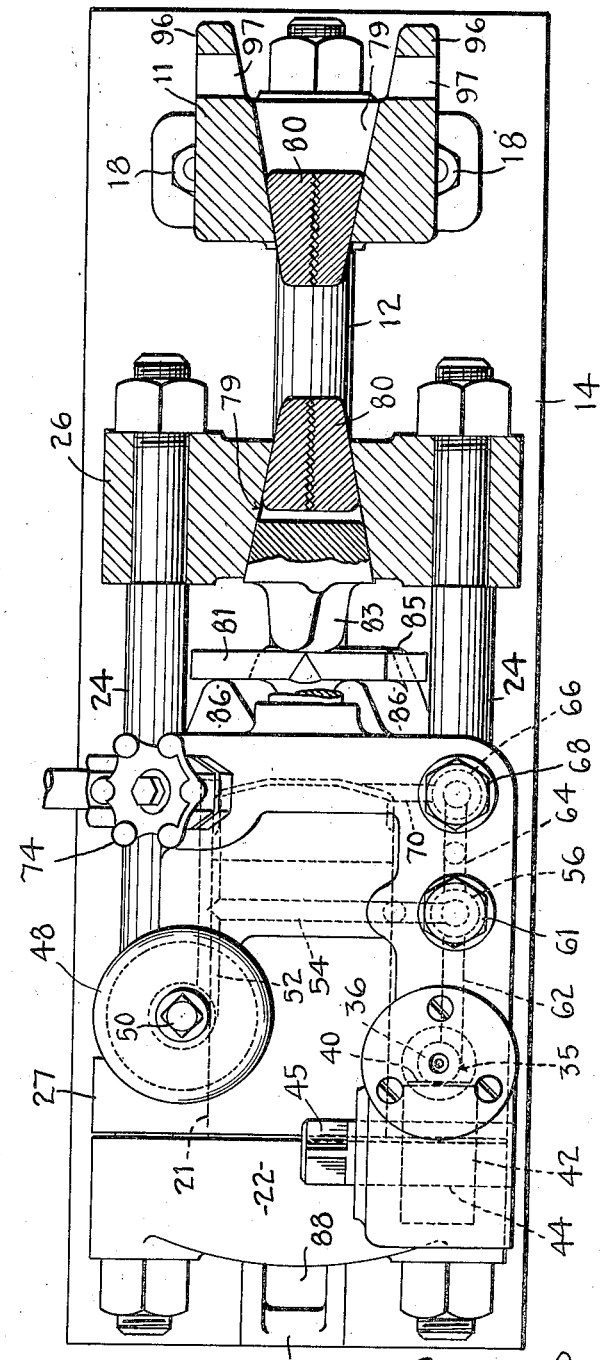

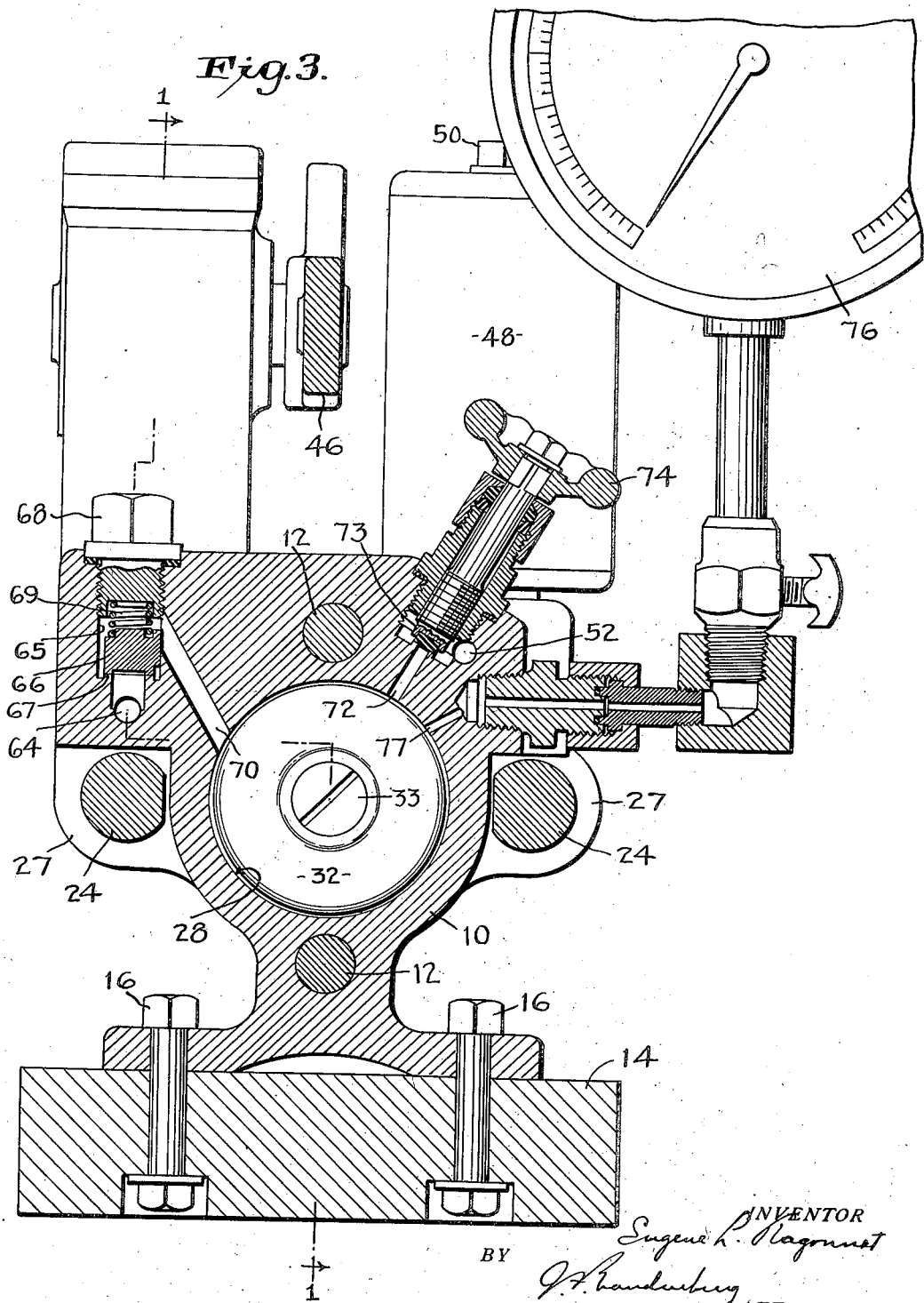

Patented Sept. 1, 1936

2,053,205

UNITED STATES PATENT OFFICE 2,053,205

PORTABLE HYDRAULIC TESTING MACHINE

Eugène L. Ragonnet, New York, N. Y., assignor to Air Reduction Company, Incorporated, New York, N. Y., a corporation of New York Application October 29, 1932, Serial No. 640,166

6 Claims. (Cl. 265—14)

This invention relates to portable testing machines.

The invention is designed primarily for determining the strength of welds by testing coupons cut from the welded pieces. An important test for weld strength is its resistance to tension strain, and this test is made by pulling a test coupon until it breaks. The pulling force is measured, and if the coupon breaks at the weld the ultimate strength of the weld can be determined from the known force and the predetermined section of the coupon. A coupon does not usually break at a well made fusion weld because the metal at the weld is stronger than the other metal of the coupon. When the break does not occur at the weld, the strength of the weld is satisfactory because no good purpose can be served by increasing the strength of the weld above that of the parent metal.

Another useful test is the determination of the resistance of the weld to bending stress. This test is made by supporting a test coupon at its opposite ends and then applying a force against the unsupported mid-portion of the coupon until it bends or breaks. The bending force is measured and the strength of the coupon computed.

Although designed primarily for testing welds, the invention is equally useful in testing any kind of coupons for determining the strength of materials.

The principal object of this invention is to provide an efficient and simplified portable machine for testing the tensile strength of coupons. Another object is to provide such a testing machine with means for also testing the bending strength of coupons.

Another object of the invention is to provide a portable hydraulic testing machine having a relatively small hand-operated pump supplying liquid to a relatively large cylinder and piston motor to operate a movable head which applies force to the test coupon, the parts of the machine being so related to one another that the entire machine comprises a compact, sturdy and efficient portable unit, well adapted for use in the field.

Another object is to provide a hydraulic testing machine of the character indicated with a handle for operating the pump, the handle being removable from the pump and adapted to fit over a fulcrum on the base of the machine and serve as a lever for forcing the motor piston and movable head back to their original positions after each testing operation of the machine.

Other objects, features and advantages of the invention will appear or be pointed out as the specification proceeds.

In the accompanying drawings, forming a part hereof:

Fig. 1 is a side elevation, mostly in section, of a testing machine designed in accordance with this invention, the section being taken on the line 1—1 of Fig. 3;

Fig. 2 is a top plan view, partly in section, of the testing machine shown in Fig. 1, with the handle and gauge removed and a coupon in position for bending;

Fig. 3 is a section on the line 3—3 of Fig. 1;

Fig. 4 is a fragmentary plan sectional view of a part of the machine shown in Fig. 2, but with a coupon held by the jaws for tensile testing;

Fig. 5 is an enlarged fragmentary sectional view on the line 5—5 of Fig. 1;

Fig. 6 is a perspective view of the valve element shown in Fig. 5; and

Fig. 7 is a side elevation, on a reduced scale, of the machine shown in Fig. 1, with the handle in position to return the motor piston and movable head.

The testing machine includes a main body portion or cylinder casting 10 and a fixed head 11 which is held in spaced relation to the cylinder casting by compression members comprising spacing rods 12, which thread into the cylinder casting and bolt to the fixed head 11. The cylinder casting is also bolted to a base 14 by bolts 16 (Figs. 3 and 7), and the fixed head 11 is fastened to the base by bolts 18 (Figs. 2 and 7).

Referring back to Fig. 1, a piston 21 is integral with a cross head 22, and the cross head is connected with a movable head 26 by tension members comprising rods 24 which slide through lugs 27 on the sides of the cylinder casting. The rods 12 extend through the movable head 26 and serve as guides on which the movable head slides. The piston 21 operates in a cylinder 28 in the cylinder casting, and has a cup 30, of leather or other suitable material, held in position on the piston head by a head member 32 and screw 33 which threads into the piston.

Liquid is supplied to the cylinder 28 by a plunger pump comprising a cylinder 35 and plunger 36 which has a head with a cup washer 38 for withstanding the liquid pressure without leaking. A rack 40 is integral with the upper end of the plunger 36; and a pinion 42 engages the rack. The pinion 42 is secured to a shaft 44 having a square end 45 (Fig. 2). A handle 46 fits over the square end of the shaft. Oscillation of the handle 46 causes the shaft 44 and pinion 42 to rock alternately in opposite directions so that the plunger 36 reciprocates in the cylinder 35 and pumps liquid to the motor cylinder 28 for operating the piston. The area of the head of the plunger 36 is small in comparison with the area of the piston 21, so that the machine operates on the hydraulic press principle to multiply a comparatively small force, applied to the handle 46, to a very heavy force against the piston 21.

The axis of the shaft 44 extends transversely of the machine and the handle 46 operates in a vertical plane extending lengthwise of the machine. At one end of its stroke the handle 46 is in the substantially horizontal position shown in Fig. 1. In this position the end of the handle contacts with the fixed head 11 and the entire handle occupies a position close to the other parts of the testing machine so that the assembly is compact. The oscillation of the handle in a vertical plane extending lengthwise of the machine is particularly advantageous because of the greater stability of the machine in resisting lengthwise forces. The machine is not wide or heavy enough to prevent overturning if the plane of oscillation of the handle extended transversely. Thus, the location and operation of the handle 46, with a given size of pump, permits the machine to be narrower and lighter, both of these characteristics being very desirable in a portable machine.

A vertical liquid reservoir 48, so set as to insure a constant priming of the suction valve 56, is connected to the cylinder casting 10. This reservoir has a plug 50 closing a filling opening, but a vent to the atmosphere is provided through the plug 50. The reservoir communicates at its lower end with a passage 52 (Fig. 2) in the cylinder casting 10. A branch conduit 54 extends from the passage 52 to the valve 56. This branch conduit terminates in a valve seat 58 (Fig. 1), on which the valve 56 rests when closed. The valve 56 is slidable vertically in a valve chamber 60, and a screw 61 closes the upper end of this valve chamber. The screw 61 is removable to permit access to the valve. A passage 62 connects the valve chamber 60 with the pump cylinder 35. The bottom face of the valve 56, which contacts with the valve seat 58, is circular, and the upper portion is cut away as shown in Figs. 5 and 6 so that liquid in the passage 62 can flow past the upper portion of the valve 56 into the valve chamber 60 and then downwardly past the valve and into another passage 64.

Referring again to Fig. 1, the passage 64 connects the valve chamber 60 with a valve chamber 65 containing a valve 66. The passage 64 terminates at a valve seat 67 in the lower end of the valve chamber 65. The valve 66 closes against this seat 67. The shape of the valve 67 is the same as the valve 56 already described. A screw 68 closes the upper end of the valve chamber 65, and a spring 69 holds the valve 67 closed. A conduit 70 (Fig. 3) connects the valve chamber 65 with the cylinder 28.

A passage 72 communicates with the cylinder 28 and a release valve 73 prevents liquid from flowing through this passage while the machine is being operated to apply hydraulic pressure to the piston and the connected parts. When the hydraulic pressure is to be released and the liquid returned to the reservoir 48, the release valve 73 is opened by a hand wheel 74 and liquid from the cylinder 28 flows through the passage 72, past the release valve 73, and through the passage 52, back to the reservoir 48.

A pressure gauge 76 is connected to the cylinder casting 10 by fittings such as shown in Fig. 3, and this gauge communicates with the cylinder 28 through a conduit 77. The gauge is operated by the hydraulic pressure in the cylinder, and the gauge is preferably graduated to read in terms of total force applied to the movable head 26, these graduations making allowance for friction losses in the mechanism.

The fixed head 11 and the movable head 26 each has a tapered slot 79 which contains a set of jaws 80 for gripping a test coupon 81, as shown in Fig. 4. As the pull of the jaws increases, the tapered sides of the slots 79 cause the jaws to grip the coupon more tightly. In Fig. 2 the jaws are shown closed with no coupon between them.

For making bending tests, a protuberant piece 83 is placed in the end of the tapered slot in the movable head 26. The cylinder casting 10 has a ledge 85 and spaced projections 86 at opposite ends of the ledge. A coupon to be bent is placed on the ledge and in contact with the projections 86. When the motor is operated, the movable head 26 brings the protuberant piece 83 against the coupon, midway between the projections 86. Fig. 2 shows a coupon in position for a bending test.

The base 14 has a recess 88 at the ram end and an eye member 89 extends over the recess and is fastened to the base by bolts 90. A curved end 91 of the handle 46 hooks in the eye member 89, as shown in Fig. 7, and with this eye member as a fulcrum the handle 46 is used as a second class lever to pry the cross head 22, piston 21, and connected parts back to their original or starting position after a test. A rounded face 93 on the handle 46 bears against the cross head and transmits the force from the handle lever to the central portion of the cross head.

The valves 55 and 56 have substantially flat faces which contact with substantially flat seats 58 and 67. The valve 56 is shown in perspective in Fig. 6, and the valve 66 is of similar construction.

The top of the valve 56 is formed to receive a tool by which the valve can be rotated for grinding it to fit the seat 58. In Fig. 6 a screw-driver slot 95 is cut in the top of the valve. By removing the screw 61 (Fig. 1) a screw-driver can be inserted into the slot 95 and the valve 56 ground to fit the seat exactly.

The fixed head 11 has lugs 96 with holes 97 on opposite sides of the slot 79. When a rod 99 (Fig. 4) is placed through these holes, it extends across the end of the slot 79 and prevents the jaws from jumping out of the slot when a coupon breaks apart.

The complete operation of the machine is as follows:

When used to make a bending test, a test coupon 81 is placed on the ledge 85 with the opposite end portions of the coupon against the projections 86, as shown in Fig. 2. Liquid is then pumped into the cylinder 28 to move the piston 21, and the tension rods 24 pull the movable head 26 toward the test coupon so that the protuberant piece 83 moves into contact with the mid-portion of the coupon between the projections 86 and bends the coupon. The force with which the protuberant piece 83 loads the coupon is indicated by the gauge.

The liquid is supplied to the cylinder 28 by oscillating the handle 46 to operate the plunger 36 in the pump cylinder 35. During each up-stroke of the plunger 36, liquid from the reservoir 48 is drawn through the passage 52 to the branch conduit 54, and through this branch conduit 54, past the valve 56, and through the passage 62, to the pump cylinder 35.

During the down-stroke of the plunger 36, liquid is forced out of the pump cylinder 35 through the passage 62. The valve 56 operates as a check valve and prevents the liquid from returning to the branch conduit 54. From the passage 62, the liquid flows around the valve 56, through the passage 64, past the valve 66, and through the passage 70, to the cylinder 28.

After a test, the movable parts of the machine are returned to their original positions by opening the release valve 73, and with the handle 46 as a lever fulcrumed on the base prying the cross head 22 back to its original retracted position so that the piston 21 forces the liquid in the cylinder 28 through the passage 72, past the open release valve 73, and through the passage 52 to the reservoir.

When making a tensile test, the protuberant piece 83 is removed and the jaws 80 are moved toward the larger ends of the tapered slots until the jaws separate sufficiently to receive a test coupon. The coupon is then inserted as shown in Fig. 4, and the hydraulic mechanism operated in the same way as for a bending test.

The invention provides a simple, rugged and compact portable testing machine. The preferred embodiment has been described, but changes and modifications can be made, and various features of the invention can be used alone or in combination with other features, without departing from the invention as defined in the appended claims.

I claim:

1. A horizontal, portable, hydraulic test-machine comprising a horizontal cylinder, a liquid pump alongside the cylinder and near one end of the machine, two sets of gripping jaws spaced horizontally from each other and from the cylinder, a piston in the cylinder connected with one set of gripping jaws for moving them with respect to the other set in a horizontal direction, and mechanism for operating the pump to supply liquid to the cylinder, said operating mechanism including a handle which overlies the machine and moves in a substantially vertical plane extending lengthwise of the machine to afford the machine a high degree of stability during operation.

2. A horizontal, portable, hydraulic testing machine comprising a horizontal cylinder, a liquid pump alongside the cylinder and near one end of the machine, two sets of gripping jaws spaced horizontally from each other and from the cylinder, a piston in the cylinder connected with one set of gripping jaws for moving them with respect to the other set in a horizontal direction, and mechanism for operating the pump to supply liquid to the cylinder, said operating mechanism including a handle which overlies the machine and moves in a substantially vertical plane extending lengthwise of the machine to afford the machine a high degree of stability during operation, said handle when at one end of its stroke occupying a substantially horizontal position close to the other parts of the machine.

3. In a portable hydraulic testing machine, a base, a body casting on the base, a horizontal motor cylinder in the casting, a vertical pump cylinder, pistons in the respective cylinders, a conduit within the body casting connecting the pump and motor cylinders, manual operating mechanism for moving the pump piston to supply liquid through said conduit to the motor cylinder, said operating mechanism including a handle which moves on its force stroke in a direction substantially within the outline of the base so as to prevent toppling of the apparatus, a fixed head horizontally spaced from the body casting and connected with said body casting by spacing rods, a movable head, and connections operated by the motor for moving the movable head horizontally.

4. A portable hydraulic testing machine comprising a motor cylinder casting; a fixed head horizontally spaced from the cylinder casting; a movable head between the fixed head and the cylinder casting; means for causing the movable head to move horizontally away from the fixed head and toward the cylinder casting; a ledge on the cylinder casting for supporting a coupon; spaced projections on the cylinder casting above the ledge; and a protuberant piece carried by the movable head for forcing a coupon on the ledge against said projections and loading said coupon between said projections for bending testing.

5. In a portable hydraulic testing machine, hydraulic motor mechanism including a cylinder, spaced projections formed on one end of the cylinder for supporting the ends of a test coupon for bending tests, a fixed head spaced from the same end of the cylinder, compression members connecting said fixed head to the cylinder, a movable head between the fixed head and the end of the cylinder having said projections, a protuberant piece operated by said movable head to force a test coupon against said projections and load it between said projections, and motion-transmitting connections through which the movable head is operated by said hydraulic motor mechanism.

6. In a portable testing machine, a base; a horizontally movable head for loading test coupons; a cross head connected to the movable head; a single-acting hydraulic motor having a piston connected to the cross head; a cylinder and piston pump for supplying liquid to the hydraulic motor; an operating handle connected to the pump; a bearing on the base adapted to receive a hooked end of a lever and to serve as a fulcrum from which the lever is readily detachable, said bearing being located in such a position on the base that when the lever is connected with said bearing as a fulcrum an intermediate portion of the lever contacts with the cross head and the lever serves as a second-class lever for returning the cross head and connected parts after a power stroke of the motor by the manual application of force in a direction toward the machine.

EUGÈNE L. RAGONNET.